US006587465B1

(12) United States Patent
Dempo (10) Patent No.: US 6,587,465 B1
(45) Date of Patent: Jul. 1, 2003

(54) BASE STATION IN A MOBILE COMMUNICATION SYSTEM (75) Inventor: Hiroshi Dempo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/465,515

(22) Filed: Dec. 16, 1999

(30) Foreign Application Priority Data

Dec. 21, 1998 (JP) ............................................. 10-362099

(51) Int. Cl.[7] .............................................. H04L 12/56
(52) U.S. Cl. .................................... 370/395.1; 455/561
(58) Field of Search ................................ 455/561, 560, 455/524; 370/310, 328, 331, 474, 395, 394, 242, 528, 338; 714/746, 799

(56) References Cited

U.S. PATENT DOCUMENTS 6,134,246 A * 10/2000 Cai et al. ..................... 370/474

FOREIGN PATENT DOCUMENTS

| JP | 09-153899 | 6/1997 |
| JP | 9-261725 | 10/1997 |
| JP | 10-42337 | 2/1998 |
| JP | 10-136424 | 5/1998 |
| JP | 10-145835 | 5/1998 |
| JP | 10-164017 | 6/1998 |
| JP | 10-191435 | 7/1998 |
| JP | 10-285213 | 10/1998 |
| JP | 10-308749 | 11/1998 |

* cited by examiner

Primary Examiner—Nguyen T. Vo
(74) Attorney, Agent, or Firm—Sughrue Mion, PLLC (57) ABSTRACT A base station in a mobile communication system, which enables maintenance of a normal transmission interval of data output, and effective usage of bands, is disclosed. Quality checking part provided in a base station BS rejects those data which the base station has failed to receive in a good receiving state. Instead, quality checking part inserts an invalid data shorter than a valid data. In this way, a vacancy is created in the relevant band or slot correspondingly to a difference between the length of a valid data length and the length of an invalid or dummy data length. This vacant band can be utilized by another user, resulting in that the utilization efficiency of link between the base station and an MSC (Mobile Switching Center) is improved.

8 Claims, 8 Drawing Sheets

BASE STATION IN A MOBILE COMMUNICATION SYSTEM

BACKGROUND OF THE INVENTION

1. Field of the Invention

The present invention relates to a mobile communication system in which data exchange between a base station and a mobile terminal is performed in an asynchronous transfer mode (ATM), and particularly to a base station in a mobile communication system.

2. Description of the Related Art

There have been proposed a variety of mobile communication systems. For example, there have been disclosed examples of mobile communication systems such as in Japanese Patent Application Laid-Open Nos. HEI-9-261725 (261725/1987), HEI-10-42337(42337/1998) and HEI-10-145835(145835/1998).

The mobile communication system disclosed in the Japanese Patent Application Laid-Open HEI-9-261725 aims at effectively utilizing a link between a base station and an MSC (Mobile Switching Center), by rejecting those data which have not been normally received by the base station at soft hand-over.

Figure 5:
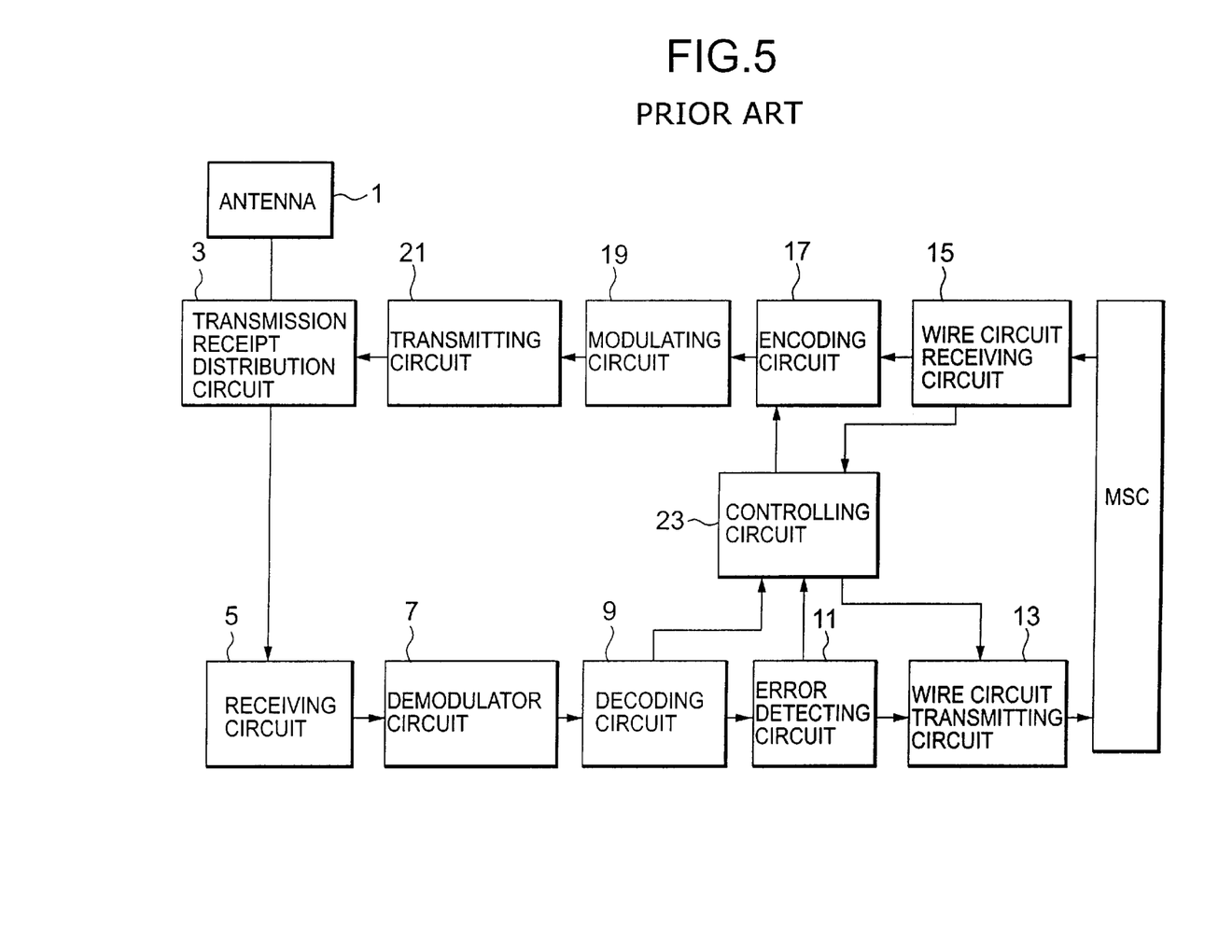
FIG. 5 is a block diagram showing a constitution of a base station in a conventional mobile communication system.

FIG. 5 is a block diagram of a base station in a mobile communication system described in the Japanese Patent Application Laid-Open HEI-9-261725.

The base station transmits and receives wireless communication data via antenna 1 and transmission/receipt distribution circuit 3. Wire circuit receiving circuit 15 receives user data from a wire network, and transmits the received user data to a controlling circuit 23 which performs error check of the user data. User data free of errors are converted into wireless communication data and then transmitted, via encoding circuit 17, modulating circuit 19, transmitting circuit 21, transmission/receipt distribution circuit 3 and the antenna 1. Contrary, from the wireless communication data received via antenna 1, transmission/receipt distribution circuit 3, receiving circuit 5, demodulator circuit 7, decoding circuit 9 and error detecting circuit 11, there is extracted a wireless communication quality information which is then transmitted to the controlling circuit 23. This controlling circuit 23 checks a wireless communication quality based on the wireless communication quality information.

The received data are rejected when the check result of the wireless communication quality is very bad, while the received data are outputted via wire circuit transmitting circuit 13 when the check result of the wireless communication quality is favorable.

Meanwhile, there is adopted an ATM network for connecting a transmitting end side base station and a receiving end side base station.

However, there is a problem in the prior art shown in FIG. 5, as follows.

In the mobile communication system shown in FIG. 5, when a transmitting mobile terminal side base station has failed to normally receive data from a transmitting mobile terminal, the transmitting mobile terminal side base station rejects all of the received data. In this case, the transmitting mobile terminal side base station transmits valid data only, to an accompanying or receiving mobile terminal side base station via MSC (Mobile Switching Center), i.e., via ATM (Asynchronous Transfer Mode) network.

In communication via ATM network, data pattern transmitted from a transmitting mobile terminal side base station may differ from that received by a receiving mobile terminal side base station, due to a cause of delay fluctuation. In the mobile communication systems shown in FIG. 5, there are not provided any countermeasures, causing such a first problem that an output pattern at the time of data transmission from receiving mobile terminal side base station toward a receiving mobile terminal differs from a data transmission pattern at the time of data transmission from a transmitting mobile terminal toward a transmitting mobile terminal side base station, due to a cause of fluctuation in an ATM network.

Figure 6:
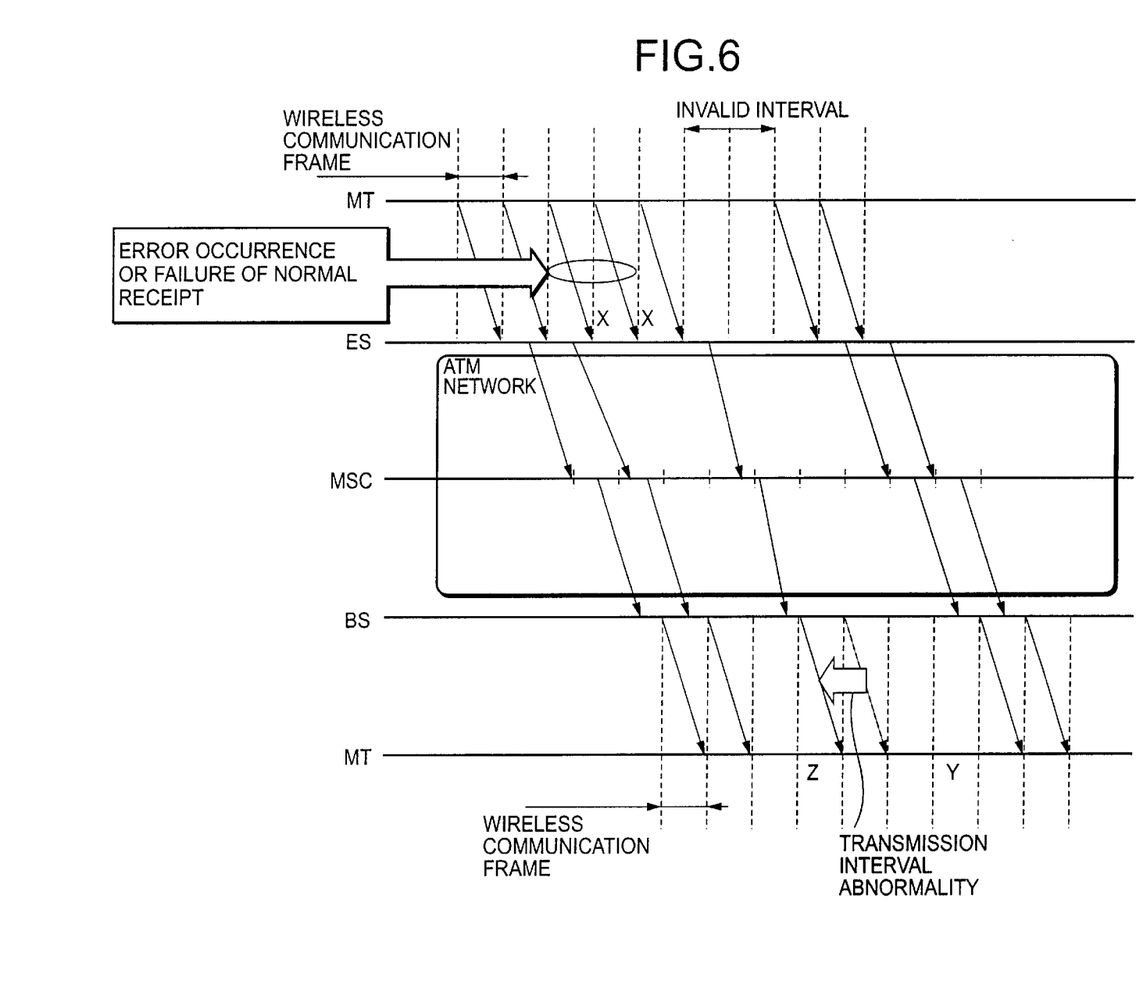
FIG. 6 is a schematic view showing a communication state between a transmitting mobile terminal and a receiving mobile terminal in the base station shown in FIG. 5.

FIG. 6 shows a data transmission sequence between a receiving mobile terminal side base station and a receiving mobile terminal. In FIG. 6, dotted line arrow Y represents a state in which data are outputted in a normal manner.

However, as represented by a solid line arrow Z in FIG. 6, a certain cell data to be received by a receiving mobile terminal side base station has arrived too early due to a delay fluctuation in the ATM network, resulting in that the data output is hastened by one frame, causing occurrence of transmission interval abnormality.

Figure 7:
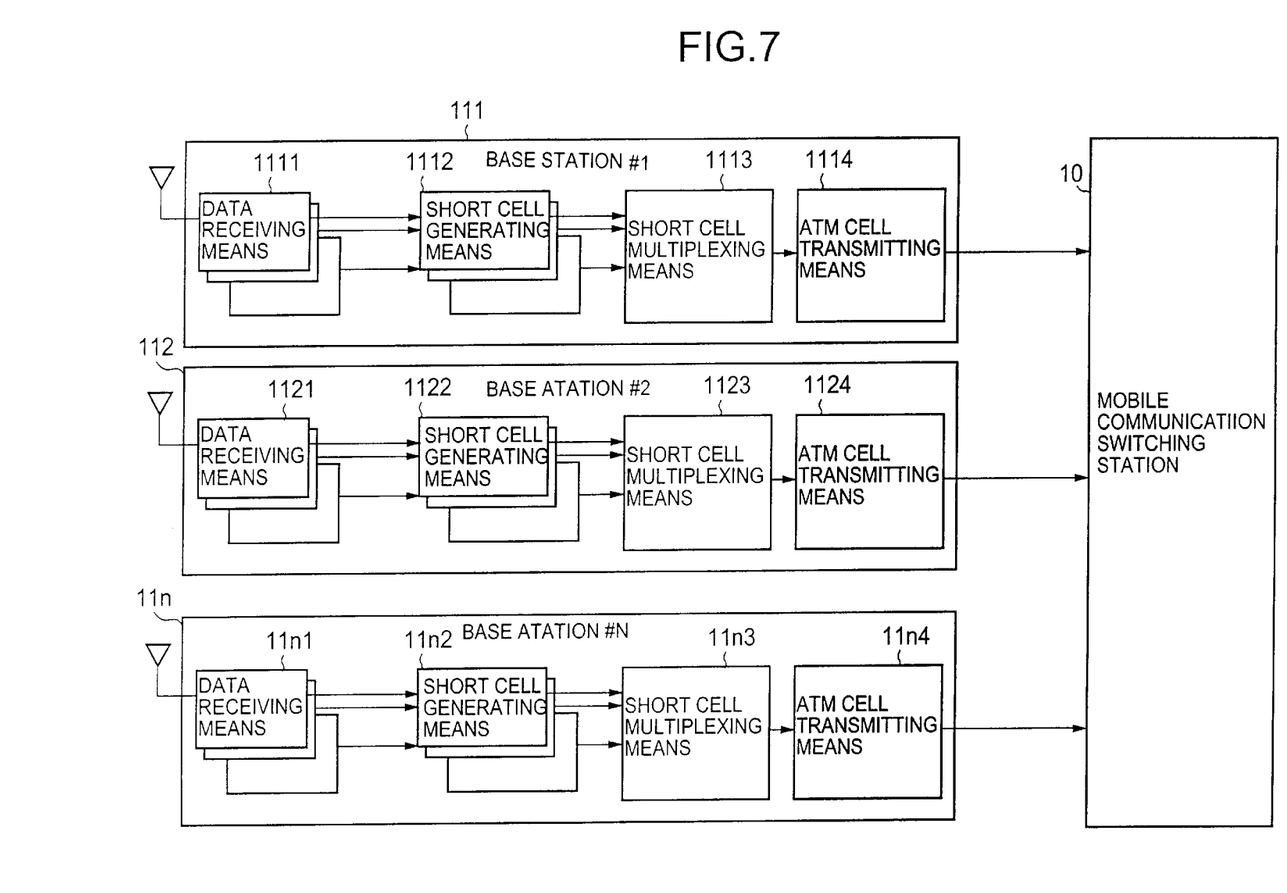
FIG. 7 is a block diagram showing a constitution of a base station in another conventional mobile communication system.

FIG. 7 is a block diagram of a mobile communication system disclosed in the Japanese Patent Application Laid-Open No. HEI-10-42337.

In this mobile communication system, base stations 111, 112, 11n receive wireless communication data at data receiving means 1111, 1121, 11n1, respectively, extract user data, wireless communication quality informations and wireless communication frame numbers from the wireless communication data, respectively, and convert them into short packets, respectively, at short cell generating means 1112, 1122, 11n2. Further, the base stations 111, 112, 11n multiplex a plurality of short cells by short cell multiplexing means 1113, 1123, 11n3, respectively, map the multiplexed data into ATM cells by ATM cell transmitting means 1114, 1124, 11n4, respectively, and then transmit the data to a mobile communication switching station 10.

This type of mobile communication system also has a problem as follows.

First problem resides in that the quality of wireless communication data received by the base stations are checked by the mobile communication switching station 10 in this mobile communication system, so that wireless communication data are transmitted up to the mobile communication switching station 10 even when some error has occurred in the wireless communication data, resulting in wasteful usage of bands.

Figure 8:
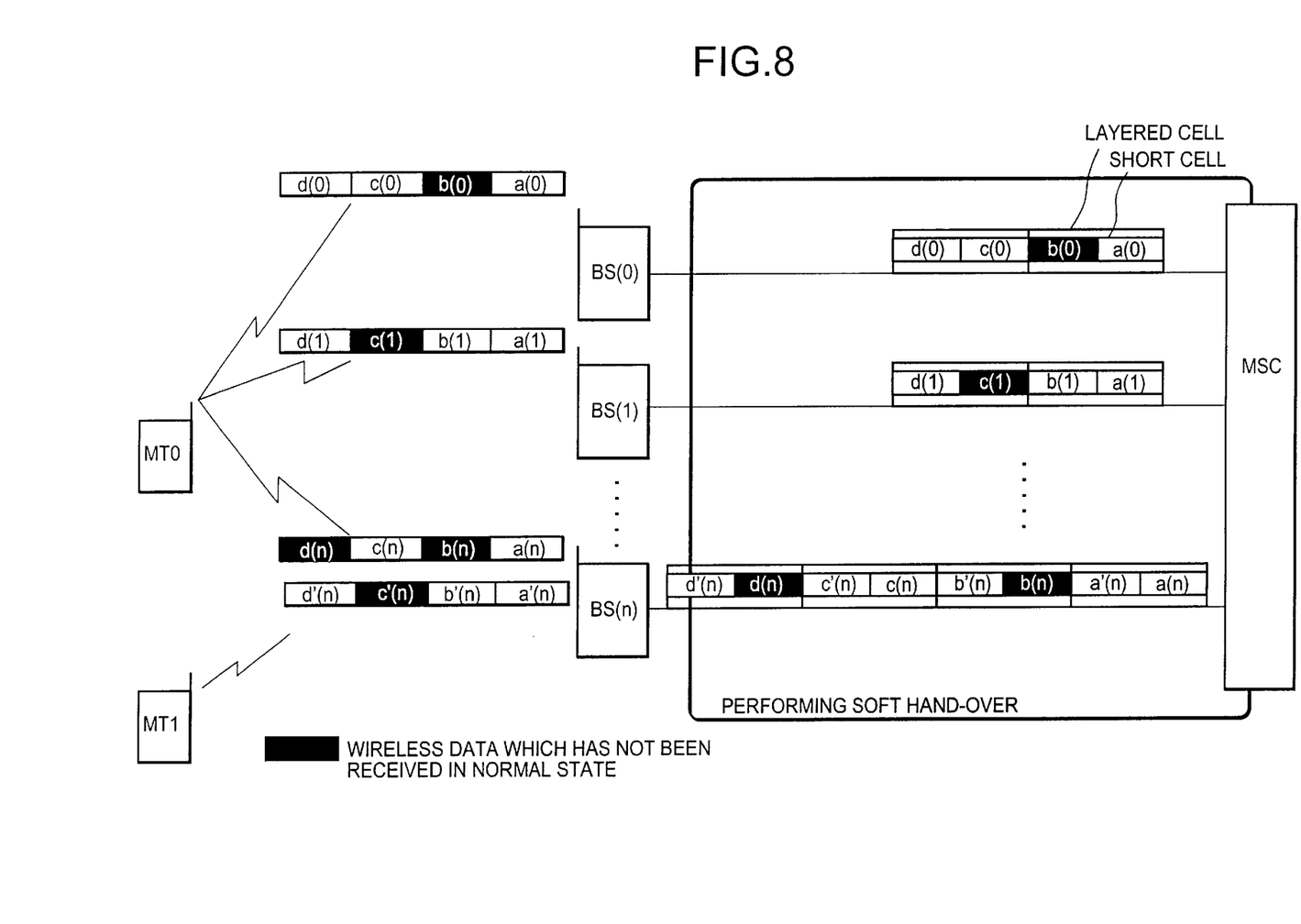
FIG. 8 is a schematic view showing a link usage state between a base station and an MSC in the base station shown in FIG. 7.

In FIG. 8, it is supposed that a base station BS(0) has received error data b(0). Since this b(0) is error data, wasteful data is transmitted between the BS(0) and MSC. Unfortunately, the function for rejecting the data is provided in the MSC side, so that the BS(0) is obliged to transmit the error data b(0) to the MSC, resulting in wasteful usage of bands.

Further, at the time of soft hand-over, there exist a plurality of paths from the mobile terminal to base stations and the mobile communication switching station, causing such a second problem that the aforementioned problem will occur in the plurality of paths.

For example, referring to FIG. 8, it can be seen that there is occurring such a situation that bands are wasted between other BS's and the MSC similarly to between BS(0) and MSC.

Further, since the short cell multiplexing means 1113, 1123, 11n3 are adopted, even short cells of error data are multiplexed due to the aforementioned first and second problems, resulting in a third problem that multiplexing waiting times of other users are increased.

The aforementioned Japanese Patent Application Laid-Open HEI-10-145835 provides a mobile communication system having a transmission path made into an ATM type, by which uninterrupted hand-over can be realized.

In this mobile communication system, when a mobile terminal has moved from one cell to another cell during communication, the frames including the same data received at asynchronous timings different from each other from both wireless base stations in respective cell areas received by a mobile switching center and identified thereby, there is then selected that data the header information of which has the lowest error rate, and frame exchange is performed at a designated timing. Further, replication of frame to be transmitted to a plurality of wireless base stations is performed, transmission timings are specified based on the header information thereof, and transmission is performed by those timings, to thereby realize uninterrupted hand-over.

However, this mobile communication system has a problem due to delay fluctuation, similarly to the mobile communication system disclosed in the aforementioned Japanese Patent Application Laid-Open HEI-9-261725.

SUMMARY OF THE INVENTION

The present invention has been carried out in view of the problems in the prior art as described above, and it is therefore an object of the present invention to provide a base station in a mobile communication system, which enables maintenance of a normal transmission interval of data output, and effective usage of bands.

To achieve the above object, there is provided a base station (BS) in a mobile communication system having a wire network adopting an ATM (asynchronous transfer mode) and an asynchronous transfer mode adaptation layer 2 (ATM Adaptation Layer 2: AAL2) in the wire network based ATM network, comprising: a quality checking part for performing quality check of user data received from a transmitting mobile terminal, and for rejecting those data which have failed in satisfying a predetermined quality; and a CPS (Common Part Sub-layer) packet generating part for generating a CPS packet, by adding a wireless communication quality information, a wireless communication frame number and a valid/invalid identifier to that user data which has satisfied a predetermined quality.

In the base station of the present invention, that data which has not been received in a good receiving state is rejected, and instead of such data, there is inserted an invalid or dummy data shorter than a valid data. As a result, a vacancy is created in the relevant band correspondingly to a difference between the length of a valid data length and the length of an invalid data length. This vacant band can be utilized by another user, thereby improving a utilization efficiency of link.

Further, all of the CPS packets are loaded with wireless communication frame numbers, respectively, and the receiving side base station adjusts output intervals of user data based on the wireless communication frame numbers. Thus, the valid data intervals at a transmitting end side mobile terminal can be normally held at a receiving end side base station or at an ATM adaptation layer 2 terminating device.

Further, existing CODEC's (COder-DECoder) to be provided within mobile terminals include one which does not output a silent packet in a silent state. As such, in the present invention, there is also inserted an invalid data even if any valid data has not been transmitted when a base station receives a wireless data, and the inserted invalid data is rejected at a receiving end side base station or at an AAL2 terminating device. Thus, the output interval between valid user data at a transmitting mobile terminal can be maintained at the time when a receiving end side base station or an AAL2 terminating device outputs the user data.

The base station of present invention further comprising: a CPS packet receiving part for extracting data for quality check to be used for quality check of the user data; and an intra-base station controlling part for notifying the extracted data for quality check to the quality checking part; wherein the quality checking part preserves the quality check data, and utilizes the data for quality check for quality check of the user data.

In the base station of the present invention, the quality checking part outputs an invalid data generated notice to the CPS packet generating part, when the quality checking part has rejected user data from the transmitting mobile terminal, and the CPS packet generating part receives the invalid data generated notice, generates an invalid data shorter than a valid data, and CPS packetize the wireless communication frame number and the valid/invalid identifier received from the quality checking part as well as the generated invalid data.

In the base station of the present invention there is provided a base station, further comprising: a wireless communication layer terminating part; wherein the CPS packet receiving part performs a sequence check based on a wireless communication frame information loaded in a CPS packet; the CPS packet receiving part outputs user data to the wireless communication layer terminating part synchronously with a transmission timing information received from the wireless communication layer terminating part, concerning valid data of those data free of sequence error; and the CPS packet receiving part rejects those data with which sequence error has occurred and rejects invalid data, upon receiving transmission timing information to be received from the wireless communication layer terminating part.

The base station of present invention, wherein the CPS packet receiving part preserves a wireless communication frame number of user data, during output treatment and rejection treatment when the CPS packet receiving part outputs data to the wireless communication layer terminating part and rejects data, respectively.

The base station of present invention, wherein the CPS packet receiving part outputs no data, when no data to be transmitted exist at the time when the CPS packet receiving part receives transmission timing information from the wireless communication layer terminating part.

And, the base station of present invention, further comprising: a CPS-PDU generating part and an asynchronous transfer mode cell generating part; and wherein the wireless communication layer terminating part detects a void frame, if any, in wireless communication frames, and notifies a void data receipt and a wireless communication frame number to the quality checking part; the quality checking part notifies an invalid data generated notice and a wireless communication frame number, to the CPS packet generating part; the CPS packet generating part having received the invalid data generated notice, generates an invalid data and a valid/invalid identifier settled as "invalid", and CPS packetizes the generated valid/invalid identifier and the received wireless communication frame number; the CPS-PDU generating part multiplexes the CPS packet into a CPS-PDU; and the ATM cell generating part maps the CPS packet multiplexed into the CPS-PDU, into an ATM cell, and outputs the ATM cell to an ATM network.

DETAILED DESCRIPTION OF THE PREFERRED EMBODIMENTS

Figure 1:
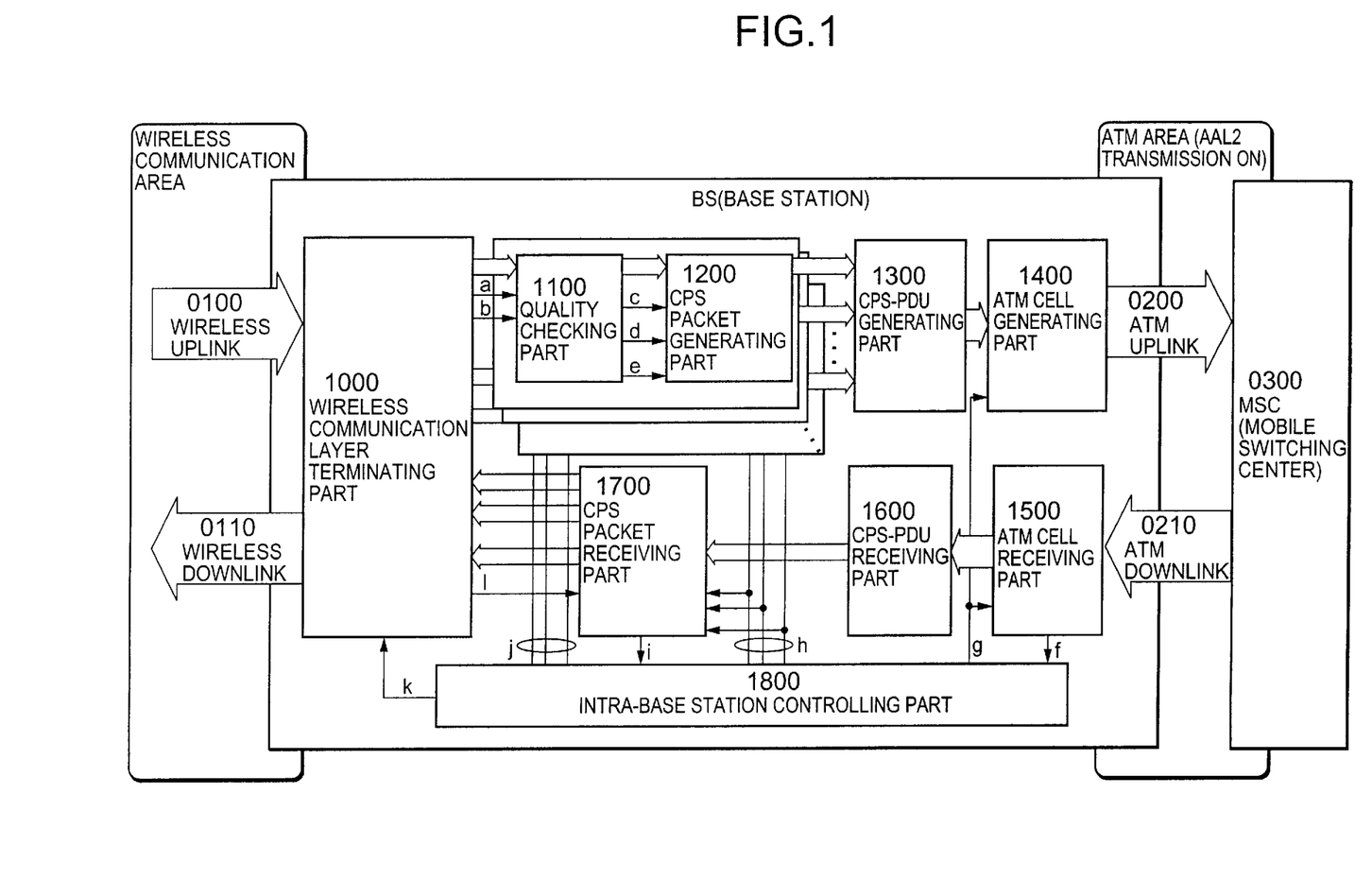
FIG. 1 is a block diagram showing a constitution of a base station in a mobile communication system according to a first embodiment of the present invention.

FIG. 1 is a block diagram showing a constitution of a base station in a mobile communication system according to a first embodiment of the present invention.

Base station (BS) according to this embodiment comprises a wireless communication layer terminating part 1000, a quality checking part 1100, a CPS (Common Part Sublayer) packet generating part 1200, a CPS-PDU (Common Part Sublayer Protocol Data Unit) generating part 1300, an ATM cell generating part 1400, an ATM cell receiving part 1500, a CPS-PDU receiving part 1600, a CPS packet receiving part 1700, and an intra-base station controlling part 1800.

Connected to the wireless communication layer terminating part 1000 are an wireless uplink 0100 and a wireless downlink 0110. Wireless communication data in a direction from a mobile terminal toward the base station is transmitted via wireless uplink 0100, while wireless communication data in a direction from the base station toward a mobile terminal is transmitted via wireless downlink 0110. Further, the ATM cell generating part 1400 and the ATM cell receiving part 1500 are connected to an MSC 0300 via ATM uplink 0200 and ATM downlink 0210, respectively. ATM cells in the direction from the base station to the MSC 0300 are transmitted via ATM uplink 0200, and ATM cells in the direction from the MSC 0300 to the base station are transmitted via ATM downlink 0210.

The MSC 0300 conducts ATM exchange or AAL2 (ATM Adaptation Layer 2) exchange.

The wireless communication layer terminating part 1000 has a function to terminate a wireless communication protocol. The wireless communication layer terminating part 1000 receives user data and controlling informations through respective channels from communicating mobile terminals via wireless uplink 0100, and outputs user data, wireless communication quality information (signal a) and wireless communication frame number (signal b) concerning respective channels toward the quality checking part 1100. The term "wireless communication quality information" means a quality information such as an electric field strength, or an error rate.

The wireless communication layer terminating part 1000 outputs a transmission timing information (signal 1) of user data toward the CPS packet receiving part 1700 at wireless data transmission timing, receives user data from the CPS packet receiving part 1700, converts the same into wireless data, and outputs the same via wireless downlink 0110.

Further, transmitted toward the wireless communication layer terminating part 1000 is a signal k representing a channel information from the intra-base station controlling part 1800.

The quality checking part 1100 receives user data, the wireless communication quality information (signal a), and the wireless communication frame number (signal b).

After quality checking treatment, the quality checking part 1100 outputs user data, wireless communication quality information (signal c) and wireless communication frame number (signal d) in case of outputting the user data, and outputs wireless communication frame number (signal d) and invalid data generated notice (signal e), toward the CPS packet generating part 1200.

Further, the quality checking part 1100 receives a judgment information (signal j) necessary for quality check from the intra-base station controlling part 1800.

The CPS packet generating part 1200 receives user data, wireless communication quality information (signal c) and wireless communication frame number (signal d), or wireless communication frame number (signal d) and invalid data generated notice (signal e), from the quality checking part 1100.

AAL2 channel information (signal h) necessary for a CPS packetization treatment is notified from the intra-base station controlling part 1800 to the CPS packet generating part 1200.

The CPS packet generating part 1200 outputs the generated CPS packet to the CPS-PDU generating part 1300.

The CPS-PDU generating part 1300 multiplexes the CPS packet received from the CPS packet generating part 1200 into CPS-PDU, and outputs the same to the ATM cell generating part 1400.

The ATM cell generating part 1400 maps the CPS-PDU into ATM cells, and outputs the same to the ATM uplink 0200. In this embodiment, the number of output port is one.

The ATM cell generating part 1400 receives ATM channel information (signal g) from the intra-base station controlling part 1800. The ATM channel information includes such as ATM connection setting information, ATM connection releasing information.

The ATM cell receiving part 1500 receives ATM cells from the MSC 0300 via ATM downlink 0210. In this embodiment, the number of input port is one. The ATM cell receiving part 1500 outputs CPS-PDU's extracted from ATM cells to the CPS-PDU receiving part 1600.

When the ATM cell receiving part 1500 has received ATM cells loaded with ATM channel information (such as ATM connection setting information, ATM connection releasing information), this part 1500 notifies the received ATM channel information to the intra-base station controlling part 1800 as a signal f.

Further, the ATM cell receiving part 1500 receives ATM channel information (signal g) to be used for ATM cell receiving treatment, from the intra-base station controlling part 1800.

The CPS-PDU receiving part 1600 receives CPS-PDU's from the ATM cell receiving part 1500, and outputs CPS packets extracted from CPS-PDU's to the CPS packet receiving part 1700.

The CPS packet receiving part 1700 receives CPS packets from the CPS-PDU receiving part 1600, and outputs user data extracted from CPS packets toward the wireless communication layer terminating part 1000.

It is noted that when the CPS packet receiving part 1700 has received a CPS packet containing controlling information (such as AAL2 connection setting information, AAL2 connection releasing information, quality information, wireless communication connection setting information, wireless communication connection releasing information), this part 1700 extracts controlling information from the CPS packet and outputs the same (signal i) to the intra-base station controlling part 1800. The controlling information includes such as AAL2 connection setting information, AAL2 connection releasing information, quality information, wireless communication connection setting information, and wireless communication connection releasing information.

The CPS packet receiving part 1700 receives AAL2 channel information (such as AAL2 connection setting information, AAL2 connection releasing information) (signal h) from the intra-base station controlling part 1800.

The intra-base station controlling part 1800 conducts controlling such as connection setting/releasing for respective functions in the base station. The intra-base station controlling part 1800 receives ATM channel information (such as ATM connection setting information, ATM connection releasing information) as signal f from the ATM cell receiving part 1500, and controlling information (such as AAL2 connection setting information, AAL2 connection releasing information, quality information, wireless communication connection setting information, wireless communication connection releasing information) as signal i from the CPS packet receiving part 1700.

From the received controlling information, the intra-base station controlling part 1800 outputs: ATM channel information (such as ATM connection setting information, ATM connection releasing information) as signal g toward the ATM cell generating part 1400 and the ATM cell receiving part 1500; AAL2 channel information as signal h to the CPS packet generating part 1200 and the CPS packet receiving part 1700; quality information (such as electric field strength information, error rate) as signal j to the quality checking part 1100; and controlling information (such as wireless communication connection setting information, wireless communication connection releasing information) concerning wireless link, as signal k, to the wireless communication layer terminating part 1000.

There will be described hereinafter an operation of the base station according to this embodiment.

At the wireless communication layer terminating part 1000, the pertinent base station according to this embodiment receives data outputted from a transmitting mobile terminal in uplink direction through the wireless uplink 0100.

The wireless communication layer terminating part 1000 has a function to terminate a wireless communication protocol. This part 1000 extracts user data, wireless communication quality information (error correction information such as CRC (Cyclic Redundancy Check)) and wireless communication frame number, from the received wireless communication frame; generates receiving state information (such as electric field strength information at the time of receiving); and outputs user data, wireless communication quality information (these are supposed to be error correction information and electric field strength information, in this embodiment), and wireless communication frame number, to the quality checking part 1100.

When the wireless communication layer terminating part 1000 has received user data from the CPS packet receiving part 1700 in a downlink direction, this part 1000 outputs the user data to a user channel on the wireless downlink 0110.

The wireless communication layer terminating part 1000 receives information concerning wireless link from the intra-base station controlling part 1800, and holds this information. The wireless communication layer terminating part 1000 performs wireless link setting treatment when the information is connection setting information, and performs wireless link releasing treatment when the information is connection releasing information.

The quality checking part 1100 performs quality check treatment, based on user data, wireless communication frame number and wireless communication quality information (error correction information, electric field strength information) received from the wireless communication layer terminating part 1000, and based on quality information received from the intra-base station controlling part 1800.

For example, the quality checking part 1100 compares electric field strength information from the wireless communication layer terminating part 1000 with electric field strength information received from the intra-base station controlling part 1800. When the electric field strength information received from the wireless communication layer terminating part 1000 is smaller than the electric field strength information received from the intra-base station controlling part 1800, the quality checking part 1100 rejects the received user data, and outputs an invalid data generated notice and a wireless communication frame number to the CPS packet generating part 1200.

Conversely, when the electric field strength information received from the wireless communication layer terminating part 1000 is equal to or larger than the electric field strength information received from the intra-base station controlling part 1800, the quality checking part 1100 then calculates a data error rate between the base station and the relevant mobile terminal, based on the error information. The quality checking part 1100 compares the thus calculated data error rate with the error rate received from the intra-base station controlling part 1800. When the data error rate as a calculation result is larger than the error rate received from the intra-base station controlling part 1800, the quality checking part 1100 rejects the received user data, and notifies an invalid data generated notice and a wireless communication frame number to the CPS packet generating part 1200.

When the data error rate as a calculation result is equal to the error rate received from the intra-base station controlling part 1800, or when the data error rate as a calculation result is smaller than the error rate received from the intra-base station controlling part 1800, the quality checking part 1100 outputs the received user data, wireless communication frame number and wireless communication quality information (such as electric field strength, error rate) to the CPS packet generating part 1200.

The quality information is notified as a signal j from the intra-base station controlling part 1800 to the quality checking part 1100 at the time of connection setting or at the time of occurrence of soft hand-over, and is held at the quality checking part 1100.

Upon receiving user data, wireless communication quality information and wireless communication frame number from the quality checking part 1100, the CPS packet generating part 1200 adds the wireless communication quality information and wireless communication frame number to the received user data, generates a valid/invalid identifier settled as "valid", and adds the same to the received user data, to thereby perform a CPS packetization treatment.

For the CPS packetization treatment, there is executed a treatment described in ITU-T recommendation I.363.2.

After completion of the CPS packetization treatment, the CPS packet generating part 1200 outputs the CPS packet to the CPS-PDU generating part 1300.

Upon receiving the invalid data generated notice and the wireless communication frame number from the quality checking part 1100, the CPS packet generating part 1200 generates invalid data and a valid/invalid identifier settled as "invalid", and adds the wireless communication frame number and the valid/invalid identifier to the invalid data, to thereby perform a CPS packetization treatment. After completion of the CPS packetization treatment, the CPS packet generating part 1200 outputs the CPS packet to the CPS-PDU generating part 1300.

AAL2 channel information is transmitted as a signal h from the intra-base station controlling part 1800 to the CPS packet generating part 1200, and held by the CPS packet generating part 1200. The CPS packet generating part 1200, which has received the AAL2 channel information, sets AAL2 connection when the AAL2 channel information is an AAL2 connection setting information, and releases the AAL2 connection when the AAL2 channel information is an AAL2 connection releasing information.

Then, upon receiving the CPS packet from the CPS packet generating part 1200, the CPS-PDU generating part 1300 performs a multiplexing treatment for the received CPS packet into CPS-PDU, to thereby generate CPS-PDU.

For the multiplexing treatment to CPS-PDU, there is executed a treatment described in ITU-T recommendation I.363.2.

Upon completion of CPS-PDU generation treatment, the CPS-PDU generating part 1300 outputs the CPS-PDU to the ATM cell generating part 1400.

Upon receiving the CPS-PDU from the CPS-PDU generating part 1300, the ATM cell generating part 1400 adds an ATM cell header to the received CPS-PDU, to thereby produce an ATM cell.

Upon completion of ATM cell generating treatment, the ATM cell generating part 1400 outputs the ATM cell to the ATM uplink 0200. In case of absence of ATM cell to be transmitted at an ATM cell transmission timing, the ATM cell generating part 1400 generates a void cell, and outputs this void cell to the ATM uplink 0200.

ATM channel information required at the time of generation of an ATM cell header is notified as a signal g from the intra-base station controlling part 1800 to the ATM cell generating part 1400, and is held by the ATM cell generating part 1400. The ATM cell generating part 1400 sets ATM connection when the received ATM channel information is connection setting information, and releases ATM connection when the received ATM channel information is connection releasing information.

The MSC 0300 receives ATM cells from the base station BS via ATM uplink 0200, and perform ATM exchange treatment or AAL2 exchange treatment.

In case that the MSC 0300 has a soft hand-over treatment function, when a certain user has fallen into a soft hand-over state, the MSC 0300 extracts user data, wireless communication quality information, wireless communication frame number and a valid/invalid identifier from CPS packets received from a plurality of paths, and performs data selection treatment for that user data the valid/invalid identifiers of which is settled "valid". Namely, there is selected data having the best quality. The data selection treatment is performed based on the same frame number.

The selected user data is again CPS packetized, together with wireless communication quality information, wireless communication frame number and valid/invalid identifier, multiplexed into CPS-PDU and ATM cell, and outputted.

In the data selection treatment, invalid data is not subjected to the data selection treatment. However, if any valid CPS packets have not been received after a lapse of a predetermined period of time, invalid data is selected. Next, upon receiving ATM cells via ATM downlink 0210, the ATM cell receiving part 1500 performs checking for an ATM cell header, such as VPI/VCI check, HEC check.

In this checking treatment, in case of occurrence such as of VPI error (for example, receipt of ATM cell having an unsettled VPI value) or HEC error, the ATM cell receiving part 1500 rejects the received ATM cell. The ATM cell receiving part 1500 also rejects the received ATM cell, upon receiving an ATM cell having an unsettled ATM channel, or a void cell.

When the checking treatment for the received ATM cell has been normally finished, the ATM cell receiving part 1500 extracts CPS-PDU from the ATM cell, and outputs the extracted CPS-PDU to the CPS-PDU receiving part 1600.

ATM channel information is notified as a signal g from the intra-base station controlling part 1800 to the ATM cell receiving part 1500, and held by the ATM cell receiving part 1500. The ATM cell receiving part 1500 sets an ATM connection when the ATM channel information is a connection setting information, and releases the ATM connection when the ATM channel information is a connection releasing information.

When the ATM cell receiving part 1500 has received an ATM cell loaded with ATM channel information, the ATM cell receiving part 1500 extracts the ATM channel information after normal completion of ATM cell header checking treatment, and outputs this ATM channel information to the intra-base station controlling part 1800 as a signal f. As to which of controlling information and user information has been loaded into the received ATM cell, is discriminated based the VPI/VCI information in the ATM cell header.

Upon receiving CPS-PDU from the ATM cell receiving part 1500, the CPS-PDU receiving part 1600 performs CPS-PDU header checking treatment for the received CPS-PDU. For the CPS-PDU header checking treatment, there is executed a treatment described in ITU-T recommendation I.363.2. In case of occurrence of error in the CPS-PDU header checking treatment, the received CPS-PDU is rejected.

In case of normal completion of the CPS-PDU header checking treatment, the CPS-PDU receiving part 1600 performs CPS packet extraction treatment. In this CPS packet extraction treatment, there is executed a treatment described in ITU-T recommendation I.363.2. In case of occurrence of error in the CPS packet extraction treatment, the CPS packet is rejected.

The CPS packet, the CPS packet extraction treatment for which has been normally completed, is outputted from the CPS-PDU receiving part 1600 to the CPS packet receiving part 1700.

The CPS packet receiving part 1700 distributes the CPS packets received from the CPS-PDU receiving part 1600, into respective channels, based on channel identifiers (CID), and extracts user data, wireless communication frame numbers and valid/invalid identifiers from the CPS packets.

However, when a CPS packet having unexisting output destination has been extracted, this CPS packet is rejected.

The CPS packet receiving part 1700 then outputs the user data to the wireless communication layer terminating part 1000 synchronously with transmission timing information from the wireless communication layer terminating part 1000. It is noted that, except for a first CPS packet, only the data, for which the checking treatment as described hereinafter has been normally completed, is outputted.

In the data output treatment, the CPS packet receiving part 1700 performs a sequence check, making use of a wireless communication frame number. This is a treatment in which the CPS packet receiving part 1700 preserves a wireless communication frame number of the data during data output treatment, and compares the preserved wireless communication frame number with the wireless communication frame number of the next received data, at the time of data output treatment of the next received data. The situation, where the wireless communication frame number of the data during the current output treatment is larger by 1 than the preserved wireless communication frame number, is judged to be normal. Other situation is judged to be in error, and in this case the data is rejected.

The CPS packet receiving part 1700 then performs a valid/invalid discriminating treatment. The CPS packet receiving part 1700 rejects the data when the valid/invalid identifier is settled as "invalid", and outputs the data to the wireless communication layer terminating part 1000 when the valid/invalid identifier is settled "valid".

As described above, the wireless communication frame number information is preserved by the CPS packet receiving part 1700, at the time of data output or data rejection.

At the time of receiving a first CPS packet, the CPS packet receiving part 1700 preserves a wireless communication frame number, and starts from a valid/invalid discriminating treatment of the aforementioned checking treatment by skipping or excluding a sequence check based on the wireless communication frame number.

When no data to be transmitted exist upon receiving a transmission timing information, the CPS packet receiving part 1700 outputs nothing.

AAL2 channel information is transmitted as a signal h from the intra-base station controlling part 1800 to the CPS packet generating part 1200, and the CPS packet generating part 1200 preserves the same. The CPS packet generating part 1200 sets an AAL2 connection when the AAL2 channel information is AAL2 connection setting information, and releases the AAL2 connection when the AAL2 channel information is an AAL2 connection releasing information.

Upon receiving a CPS packet loaded with controlling information, the CPS packet receiving part 1700 extracts the controlling information from the CPS packet, and outputs the same as signal i to the intra-base station controlling part 1800. As to which of controlling information and user information has been loaded into the received CPS packet, is discriminated based the CID information in the CPS packet header.

The intra-base station controlling part 1800 controls functions within the base station.

The intra-base station controlling part 1800 receives an ATM channel information from the ATM cell receiving part 1500, then notifies the ATM channel information as a signal g to the ATM cell generating part 1400 and to the ATM cell receiving part 1500, and performs an ATM connection setting treatment or an ATM connection releasing treatment. The intra-base station controlling part 1800 receives controlling information (signal i) from the CPS packet receiving part 1700. When the received controlling information is an AAL2 channel information, the intra-base station controlling part 1800 outputs the AAL2 channel information (signal h) to the CPS packet generating part 1200 and the CPS packet receiving part 1700, to thereby perform an AAL2 connection setting treatment or an AAL2 connection releasing treatment. When the received controlling information is a quality information, the intra-base station controlling part 1800 outputs the quality information (signal j) to the quality checking part 1100, to thereby perform quality setting. When the received controlling information is a connection information for a wireless link, the intra-base station controlling part 1800 outputs a connection information of wireless link to the wireless communication layer terminating part 1000, to thereby perform connection setting or connection releasing of the wireless link.

The base station in the mobile communication system according to this embodiment is constituted to be able to utilize the link between base station (BS) and the MSC, with a higher efficiency. To enable usage of link between base station and MSC with a higher efficiency, there is provided the quality checking part 1100 within the base station, so that the data which has not been received in a good receiving state is rejected, and instead of it, there is inserted an invalid data which is shorter than a valid data. In this way, a vacancy is created in the relevant band correspondingly to a difference between the length of a valid data length and the length of an invalid data length. This vacant band can be utilized by another user, resulting in a first effect that the utilization efficiency of link is improved.

Figure 2:
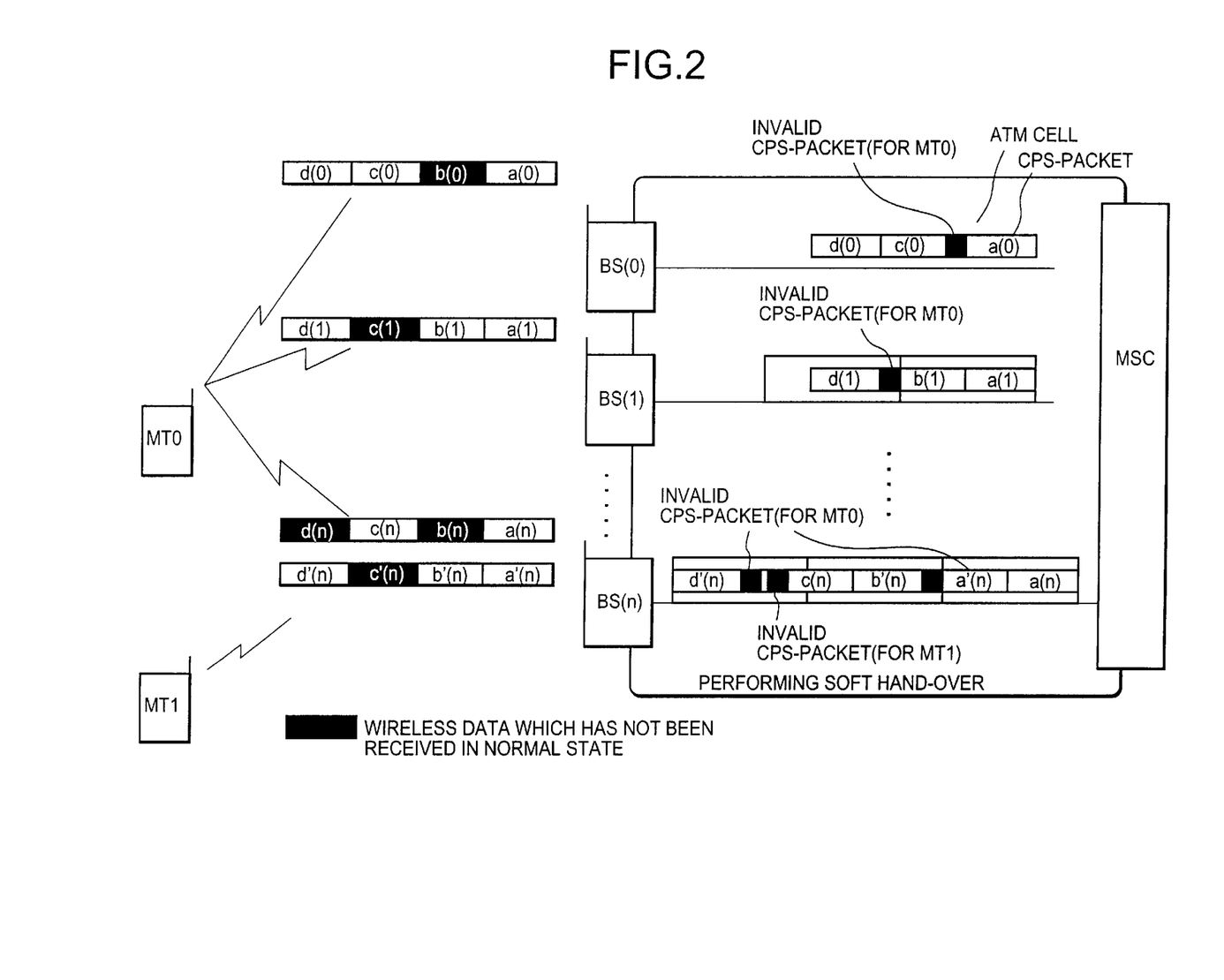
FIG. 2 is a schematic view showing a link usage state between a base station and an MSC in the first embodiment.

As shown in FIG. 2, for example, the base station BS(0) rejects wireless data b(0) which has not been normally received, and instead, inserts an invalid or dummy CPS packet. In this case, by shortening the data length of the invalid CPS packet than that of a wireless data b(0), there is created a vacant band corresponding to a difference between the data length of the invalid CPS packet and the data length of the wireless data b(0). By utilizing this vacant band for another valid data, the utilization efficiency of the band can be improved.

Comparing FIG. 8 showing a multiplexing state of wireless data in the prior art with FIG. 2 showing the multiplexing state of wireless data in the present embodiment, it becomes apparent that the utilization efficiency of the respective bands is improved in the present embodiment.

Further, upon occurrence of soft hand-over, one and the same data of one and the same user is transmitted in a plurality of paths. According to the base station of the mobile communication systems according to this embodiment, that data which has not been received in a good receiving state is substituted by an invalid data shorter than it. Thus, there can be obtained a second effect that the multiplex delay due to ATM cell establishment from wireless data of one user, caused by a soft hand-over treatment of another user, can be minimized.

As shown in FIG. 2, in a soft hand-over state, a first mobile terminal MT0 transmits its data to the MSC, through a plurality of base stations BS(0) to BS(n). Failing correct data receipt in this situation, the respective base stations BS(0) to BS(n) reject the respective received invalid data, and instead insert the respective invalid CPS packets, to thereby contemplate effective utilization of the respective bands.

The invalid CPS packet has a data length shorter than that of wireless data, so that the possible treatment time for multiplexing invalid CPS packets into ATM cells can be shortened. By virtue of this shortening of treatment time, the multiplexing waiting time for the data received from another mobile terminal MT1 is decreased so that the delay due to ATM cell establishment from wireless data of another user can be minimized.

The respective base stations do not only reject data which have not been received in a good receiving state but also insert invalid data shorter than valid data. Thus, even if delay fluctuation has occurred in the ATM network, the output interval between valid user packets at a transmitting mobile terminal can be maintained at the time when a receiving end base station or an AAL2 terminating device outputs user data, thereby providing a third effect.

Figure 3:
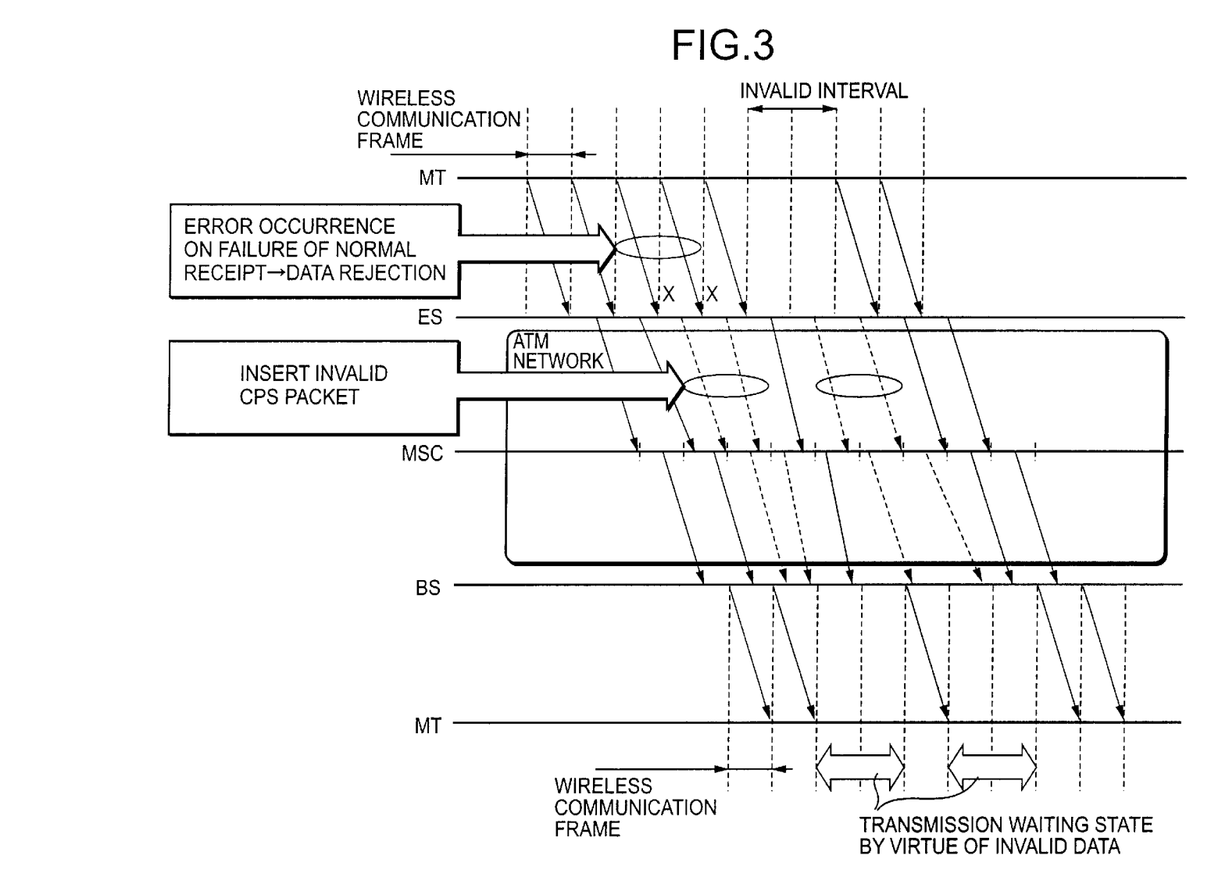
FIG. 3 is a schematic view showing a communication state between a transmitting mobile terminal and a receiving mobile terminal in the first embodiment.

FIG. 3 shows a state in which invalid data are rejected and invalid CPS packets are inserted, in the transmitting mobile terminal side base station. It can be further seen that, between the transmitting mobile terminal side base station and the receiving mobile terminal side base station, the transmitting cell pattern from the transmitting mobile terminal side base station is rendered to be different from the received cell pattern at the receiving mobile terminal side base station, such as due to delay fluctuation of the ATM network.

In such a situation, and in the conventional mobile communication systems as described above, the data interval between the transmitting side mobile terminal and base station may become different from the data interval between the receiving side base station and mobile terminal, in case that the receiving side base station outputs wireless data to the receiving side mobile terminal.

Contrary, in the mobile communication system according to the present embodiment, upon receiving an invalid CPS packet, the receiving side base station rejects this invalid CPS packet, so that the output of the wireless data from this receiving side base station is stopped, resulting in generation of a transmission waiting state corresponding to invalid data. In this way, it becomes possible for the receiving side base station to maintain the data interval between the transmission side mobile terminal and base station, when the data is rejected at the transmission side base station, as shown in FIG. 3.

Figure 4:
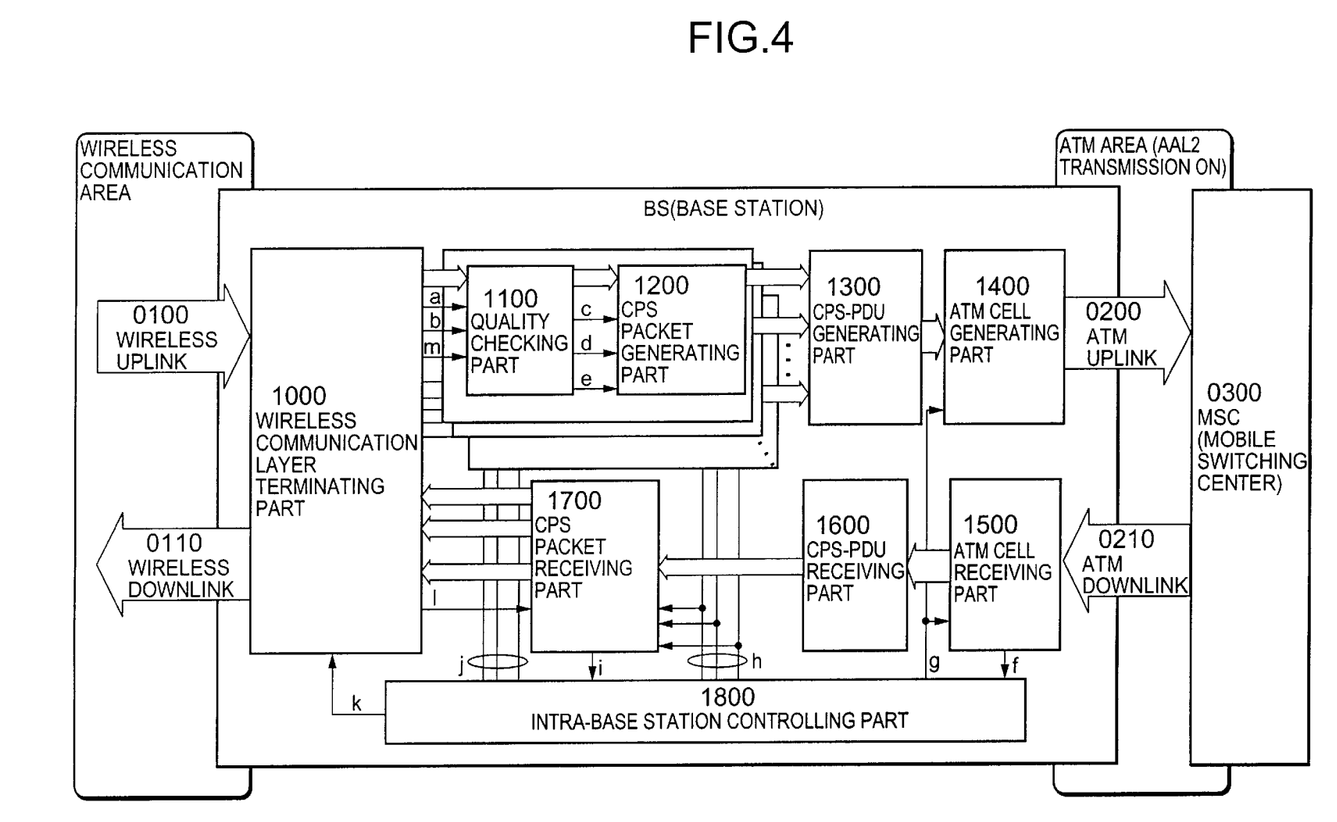
FIG. 4 is a block diagram showing a constitution of a base station in a mobile communication system according to a second embodiment of the present invention.

FIG. 4 is a block diagram showing a constitution of a base station in a mobile communication system according to a second embodiment of the present invention.

The base station in this second embodiment has a constitution identical with that of the base station in the first embodiment, but operates in a different manner. There will be described hereinafter only operations different from those of the base station in the first embodiment.

When the wireless communication layer terminating part 1000 has not received user data at a data receiving timing from the wireless link, i.e., when the wireless communication frame is a void frame, this wireless communication layer terminating part 1000 extracts a wireless communication frame number from the wireless communication frame, and output a void data received notice (signal m) and the wireless communication frame number to the quality checking part 1100.

When the quality checking part 1100 has received the void data received notice (signal m) and the wireless communication frame number from the wireless communication layer terminating part 1000, the quality checking part 1100 does not perform the quality check treatment, and outputs the wireless communication frame number and the invalid data generated notice to the CPS packet generating part 1200.

Operations of the remaining functional blocks in this embodiment are identical with those of the first embodiment.

In a general mobile communication system, audio information is data compressed by means of CODEC, and then outputted from a mobile terminal. As this kind of data compression treatment, there exist a method in which an audio information is compressed and outputted irrespectively of presence/absence of sound, and another method in which data compression is performed only at the time of presence of sound, and no data compression is performed and no data is outputted in case of absence of sound. In a mobile communication system adopting the latter audio CODEC, when a wire network has been constituted of ATM, no data exists between a sound existing period and another sound existing period. As such, there has been a problem that an interval between sound existing periods is not guaranteed at a receiving end side, due to such a cause of delay fluctuation of an ATM network, as described above.

According to this embodiment, when a wireless communication frame is a void frame at the wireless communication layer terminating part 1000, there is created and inserted an invalid data in the base station similarly to the first embodiment, and a data output is performed based on a wireless communication frame number upon output of the user data by a receiving end side base station or by an AAL2 terminating device. Thus, even in a mobile communication system in which a CODEC does not generate any invalid data in a sound absence state, there can be obtained such an effect that a frame interval between a sound existing period and another sound existing period can be guaranteed.

According to the base station in the mobile communication system according to the present invention, the quality checking part rejects those data which have not been received in a good receiving state, and instead of such data, inserts an invalid data shorter than a valid data. In this way, a vacancy is created in the relevant band correspondingly to a difference between the length of a valid data length and the length of an invalid data length. This vacant band or slot can be utilized by another user, thereby improving a utilization efficiency of link between a base station (BS) and MSC.

Further, upon occurrence of soft hand-over, one and the same data of one and the same user is transmitted in a plurality of paths. According to the base station of the mobile communication systems according to the present invention, that data which has not been received in a good receiving state is substituted by an invalid data shorter than invalid data. Thus, there can be obtained a second effect that the multiplex delay due to ATM cell establishment from wireless data of one user, generated by a cause of a soft hand-over treatment of another user, can be minimized.

Further, the base station does not only reject data which have not been received in a good receiving state but also inserts invalid data shorter than valid data. Thus, even if delay fluctuation has occurred in the ATM network, the output interval between valid user packets at a transmitting mobile terminal can be maintained at the time when a receiving end base station or an AAL2 terminating device outputs user data.

What is claimed is:

1. A base station in a mobile communication system having a wire network adopting an asynchronous transfer mode (ATM); comprising a quality checking part for performing quality check of user data received from a transmitting mobile terminal, and for rejecting those data which have failed in satisfying a predetermined quality, and for inserting an invalid data shorter than a valid data; and a CPS packet generating part for generating a CPS packet.

2. A base station in a mobile communication system having a wire network adopting an asynchronous transfer mode (ATM) and an asynchronous transfer mode adaptation layer 2 (ATM Adaptation Layer 2: AAL2); comprising a quality checking part for processing wireless communication quality information, for performing quality check of user data received from a transmitting mobile terminal, and for rejecting those data which have failed in satisfying a predetermined quality; and a CPS packet generating part for generating a CPS packet, by adding a wireless communication quality information, a wireless communication frame number and a valid/invalid identifier to that user data which has satisfied a predetermined quality.

3. The base station according to claim 2, further comprising:

a CPS packet receiving part for extracting data for quality check to be used for quality check of said user data; and an intra-base station controlling part for notifying said extracted data for quality check to said quality checking part;

wherein said quality checking part preserves said quality check data, and utilizes said data for quality check for quality check of said user data.

4. A base station in a mobile communication system having a wire network adopting an asynchronous transfer mode (ATM) and an asynchronous transfer mode adaptation layer 2 (ATM Adaptation Layer 2: AAL2); comprising a quality checking part for performing quality check of user data received from a transmitting mobile terminal, and for rejecting those data which have failed in satisfying a predetermined quality;

a CPS packet generating part for generating a CPS packet, by adding a wireless communication quality information, a wireless communication frame number and a valid/invalid identifier to that user data which has satisfied a predetermined quality;

a CPS packet receiving part for extracting data for quality check to be used for quality check of said user data; and an intra-base station controlling part for notifying said extracted data for quality check to said quality checking part;

wherein said quality checking part preserves said quality check data, and utilizes said data for quality check of said user data;

wherein said quality checking part outputs an invalid data generated notice to said CPS packet generating part, when said quality checking part has rejected user data from said transmitting mobile terminal, and said CPS packet generating part receives said invalid data generated notice, generates an invalid data shorter than a valid data, and CPS packetize said wireless communication frame number and said valid/invalid identifier received from said quality checking part as well as said generated invalid data.

5. The base station according to claim 4, further comprising:

a wireless communication layer terminating part;

wherein said CPS packet receiving part performs a sequence check based on a wireless communication frame information loaded in a CPS packet; and the CPS packet receiving part for outputting user data to said wireless communication layer terminating part synchronously with a transmission timing information received from said wireless communication layer terminating part, concerning valid data of those data free of sequence error, and rejecting those data with which sequence error has occurred and rejects invalid data, upon receiving transmission timing information to be received from said wireless communication layer terminating part.

6. The base station according to claim 5, wherein said CPS packet receiving part preserves a wireless communication frame number of user data, during output treatment and rejection treatment when said CPS packet receiving part outputs data to said wireless communication layer terminating part and rejects data, respectively.

7. The base station according to claim 6, wherein said CPS packet receiving part outputs no data, when no data to be transmitted exist at the time when said CPS packet receiving part receives transmission timing information from said wireless communication layer terminating part.

8. The base station according to claims 7, further comprising:

a CPS-PDU generating part and an asynchronous transfer mode cell generating part; and the wireless communication layer terminating part detecting a void frame, if any, in wireless communication frames, and notifying a void data receipt and a wireless communication frame number to said quality checking part; and the quality checking part notifying an invalid data generated notice and a wireless communication frame number, to said CPS packet generating part; and the CPS packet generating part receiving said invalid data generated notice, generating an invalid data and a valid/invalid identifier settled as "invalid", and CPS packetizes said generated valid/invalid identifier and said received wireless communication frame number; and the CPS-PDU generating part multiplexing said CPS packet into a CPS-PDU; and the ATM cell generating part mapping said CPS packet multiplexed into said CPS-PDU, into an ATM cell, and outputting said ATM cell to an ATM network.

* * * * *